United States Patent
Wang et al.

(10) Patent No.: US 11,299,413 B2
(45) Date of Patent: Apr. 12, 2022

(54) METHOD FOR MODIFYING WASTEWATER TREATMENT DEVICE

(71) Applicant: Nanjing University, Nanjing (CN)

(72) Inventors: Jinfeng Wang, Nanjing (CN); Hongqiang Ren, Nanjing (CN); Bing Wu, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

(21) Appl. No.: 17/003,968

(22) Filed: Aug. 26, 2020

(65) Prior Publication Data

US 2021/0094854 A1 Apr. 1, 2021

(30) Foreign Application Priority Data

Sep. 30, 2019 (CN) .......................... 201910941118.7

(51) Int. Cl.
*C02F 3/34* (2006.01)

(52) U.S. Cl.
CPC .............. *C02F 3/348* (2013.01); *C02F 3/341* (2013.01); *C02F 3/342* (2013.01); *C02F 2203/006* (2013.01); *C02F 2303/06* (2013.01)

(58) Field of Classification Search
CPC .......... C02F 3/348; C02F 3/341; C02F 3/342; C02F 2203/006; C02F 2303/06; C02F 3/08; C02F 3/1257; C02F 3/30; C02F 3/101; C02F 3/109; C02F 3/10; C02F 3/2806; C02F 3/34; Y02W 10/10
USPC ............... 210/606, 631, 632, 205; 366/169.1
See application file for complete search history.

(56) References Cited

U.S. PATENT DOCUMENTS

| | | | | | |
|---|---|---|---|---|---|
| 2,592,709 | A | * | 4/1952 | Kinnaird | B01F 5/22 366/169.1 |
| 3,584,840 | A | * | 6/1971 | Fuchs | B01F 3/04602 210/101 |
| 4,112,517 | A | * | 9/1978 | Giombini | B01F 5/223 366/102 |
| 4,240,905 | A | * | 12/1980 | Scaccia | C02F 3/205 210/629 |
| 4,267,052 | A | * | 5/1981 | Chang | B01F 3/04539 210/629 |

(Continued)

FOREIGN PATENT DOCUMENTS

DE 2934833 A1 * 3/1981
FR 2192074 A1 * 2/1974

*Primary Examiner* — Fred Prince
(74) *Attorney, Agent, or Firm* — Matthias Scholl P.C.; Matthias Scholl

(57) ABSTRACT

A method for modifying a wastewater treatment device, the method including: 1) fixing a filling support in a wastewater pool, where the filling support includes a support frame; the support frame includes a hollow shaft, a fixed ring, and at least one vane; 2) adjusting the height of the filling support, until the fixed ring is submerged below the liquid level of the wastewater pool, where the water intake velocity of the wastewater pool is no less than 0.25 m/s, whereby a water current is produced and drives the support frame to rotate; 3) adding a functional liquid into the hollow shaft; and 4) adding an enzyme mixture to the hollow shaft when the rotation speed of the support frame is less than a first preset value, until the rotation speed of the support frame reaches a second preset value.

11 Claims, 4 Drawing Sheets

(56) References Cited

U.S. PATENT DOCUMENTS

| | | | | |
|---|---|---|---|---|
| 4,618,427 A | * | 10/1986 | Venås | F27D 27/00 |
| | | | | 210/629 |
| 5,484,524 A | * | 1/1996 | MacLaren | C02F 3/101 |
| | | | | 210/151 |
| 8,342,737 B2 | * | 1/2013 | Greller | C12M 27/22 |
| | | | | 366/169.1 |

* cited by examiner

METHOD FOR MODIFYING WASTEWATER TREATMENT DEVICE

CROSS-REFERENCE TO RELATED APPLICATIONS

Pursuant to 35 U.S.C. § 119 and the Paris Convention Treaty, this application claims foreign priority to Chinese Patent Application No. 201910941118.7 filed Sep. 30, 2019, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to a method for modifying a wastewater treatment device.

Currently, microorganisms are widely used in wastewater treatment. According to the suspended or attached state of microorganisms in wastewater, biological wastewater treatment technology is divided into activated sludge process where the microorganisms are suspended in the water, and biofilm process where the microorganisms are attached to a biofilm. In the activated sludge process, the bulking sludge, rising sludge, and foam-like sludge tend to occur, thus adversely affecting the effluent quality. Optionally, suspended fillings or fixed fillings are added to the activated sludge to improve the biochemical treatment efficacy of the sludge. However, the suspended fillings tend to gather at the water outlet. The fixed fillings tend to harden in the sludge tank.

SUMMARY

The disclosure provides a filling support comprising a support frame and a fixed device. The support frame comprises a hollow shaft provided with a first height adjuster. The support frame is rotatably disposed on the fixed device via the hollow shaft. The support frame further comprises a fixed ring to which a filling is secured, at least one vane disposed on the hollow shaft and below the fixed ring, and a connection pipe connecting the fixed ring and the hollow shaft. The fixed ring is a hollow structure and comprises a plurality of holes. The fixed ring communicates with the hollow shaft via the connection pipe. The at least one vane is configured to rotate in the presence of a water current thereby driving the support frame to rotate. The hollow shaft comprises an upper part provided with an opening through which a functional liquid is added to the hollow shaft; a plunger is movably disposed in the hollow shaft thereby pushing the functional liquid in the hollow shaft to move.

The plunger can be provided with a retractable seal. The retractable seal allows the plunger to tightly attach to the inner wall of the hollow shaft. The plunger acts as a pressure device.

The support frame can comprise an upper fixed ring and a lower fixed ring both connected to the hollow shaft via the connection pipe; at least one first vane is disposed between the upper fixed ring and the lower fixed ring, and at least one second vane is further disposed below the lower fixed ring.

The vane can be in the shape of a fan blade.

The fixed device can comprise an upper mounting plate, a lower mounting plate opposite to the upper mounting plate, and at least one support pillar connecting to the upper mounting plate and the lower mounting plate; and the support frame can be rotatably disposed between the upper mounting plate and the lower mounting plate.

The at least one support pillar can be provided with a second height adjuster.

The functional liquid can be a fermentation broth of quorum sensing bacteria comprising *Pseudomonas aeruginosa*, *Sinorhizobium meliloti*, *Ruegeria*, and *Xanthomonas campestris*. The quorum sensing bacteria are cultured in a lysogeny broth (LB) medium having a pH of 7.0 at 35° C. and a rotation speed of 140 rpm.

The enzyme mixture can comprise tyrosine and an acylase.

The functional liquid can be filtered using a 0.22-micron film prior to adding to the hollow shaft.

The disclosure also provides a method for modifying a wastewater treatment device, the method comprising:

1) fixing the filling support in a wastewater pool;
2) adjusting the height of the filling support using the first height adjuster, until the fixed ring is submerged below a liquid level of the wastewater pool, where a water intake velocity of the wastewater pool is no less than 0.25 m/s, whereby the water current is produced and drives the support frame to rotate; and adjusting a number of the at least one vane on the hollow shaft according to a rotation speed of the support frame;
3) adding the functional liquid via the opening into the hollow shaft, and adjusting a moving speed of the plunger so that the functional liquid is completely added in a preset time; and
4) adding an enzyme mixture to the hollow shaft when a rotation speed of the support frame is less than a first preset value, until the rotation speed of the support frame reaches a second preset value.

In 1), the diameter of the fixed ring is 0.6-0.8 times that of the wastewater pool.

In 2), the rotation speed of the support frame is 1-3 rpm.

In 3), the preset time is 12-36 hours.

In 4), the first preset value is 0.1 rpm, and the second preset value is 0.6-0.75 rpm.

The volume of the filling accounts for 30-60% of that of the wastewater pool.

The following advantages are associated with the method for modifying a wastewater treatment device of the disclosure. The support frame is rotatable, and the functional liquid comprising quorum sensing bacteria can be added to the hollow shaft of the support frame, so that the biofilm formed on the fixed ring can be in situ refreshed and activated, thus postponing the aging rate of the biofilm.

Figure 1:
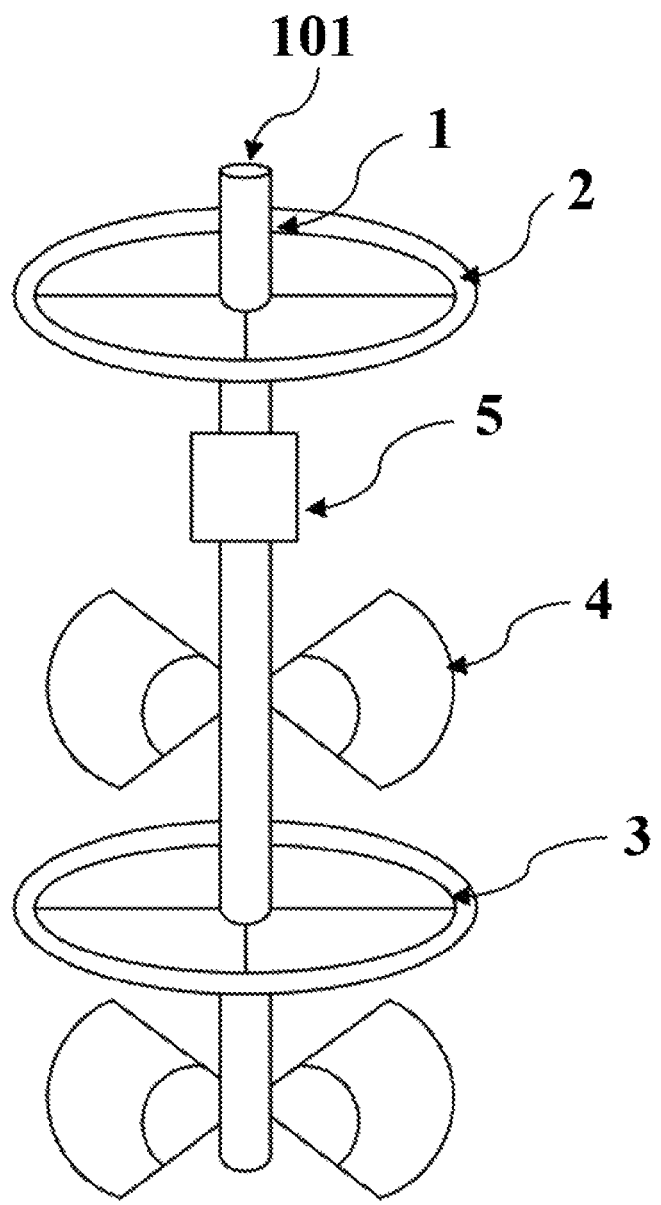
FIG. 1 is a schematic view of a support frame of a filling support according to one embodiment of the disclosure.
Figure 2:
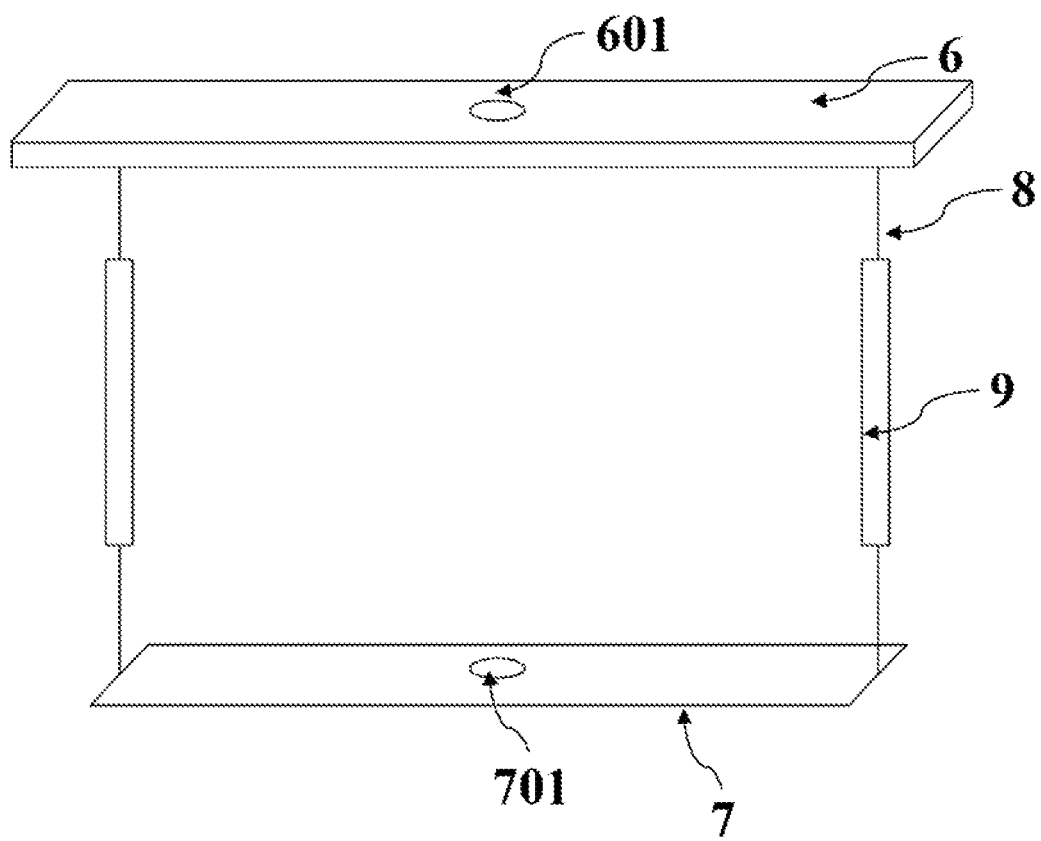
FIG. 2 is a schematic view of a fixed device of a filling support according to one embodiment of the disclosure.
Figure 3:
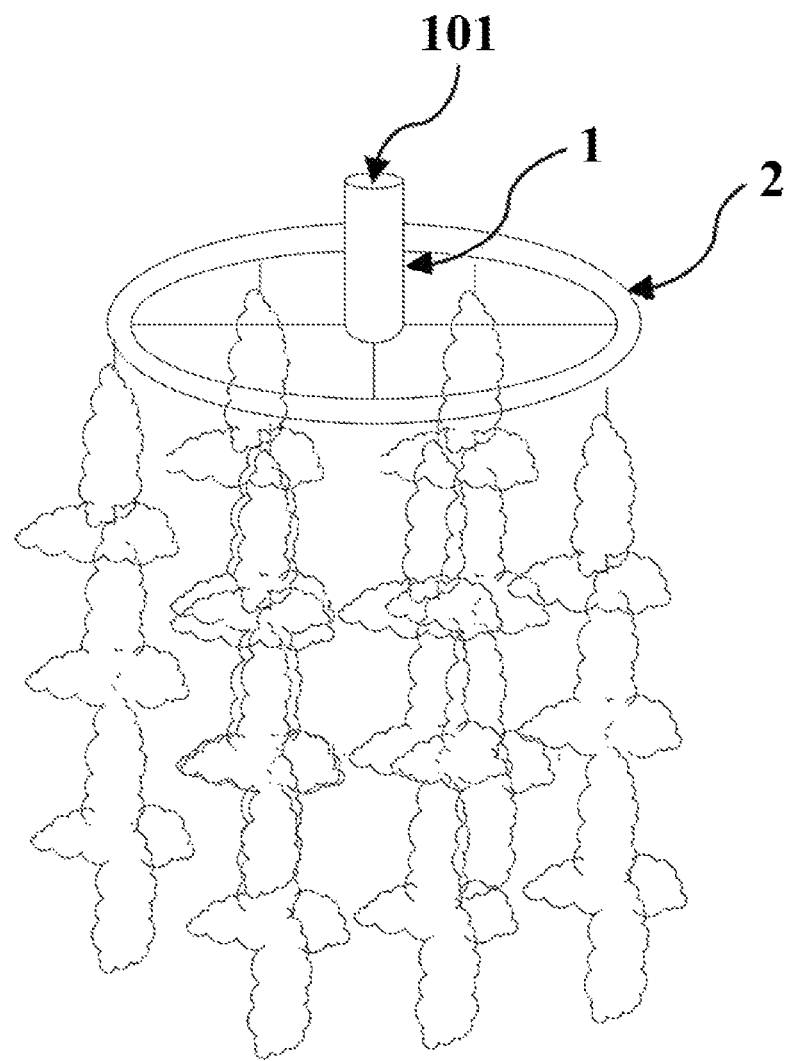
FIG. 3 is a schematic view of a fixed ring of a filling support according to one embodiment of the disclosure.
Figure 4:
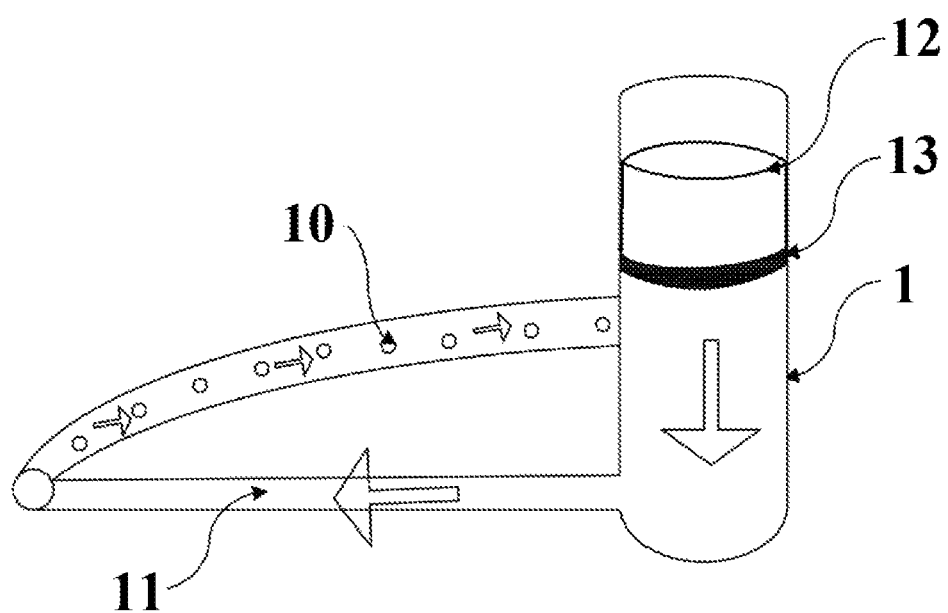
FIG. 4 is a connection diagram of a fixed ring and a hollow shaft of a filling support according to one embodiment of the disclosure.
Figure 5:
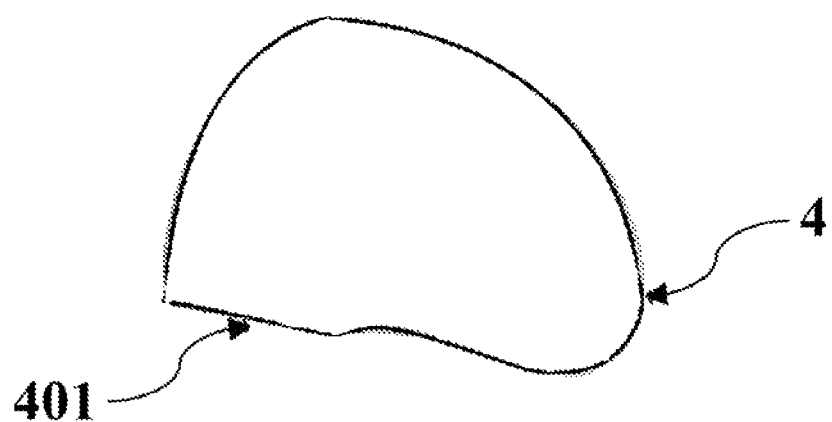
FIG. 5 is a schematic view of a fan blade-shaped vane of a filling support according to one embodiment of the disclosure.

In the drawings, the following reference numbers are used:

1. Hollow shaft; 101. Opening; 2. Upper fixed ring; 3. Lower fixed ring; 4. Vane; 401. Mounting surface; 5. First height adjuster; 6. Upper mounting plate; 601. First through hole; 7. Lower mounting plate; 701. Second through hole; 8. Support pillar; 9. Second height adjuster; 10. Hole; 11. connection pipe; 12. Plunger; 13. Seal.

DETAILED DESCRIPTION

To facilitate those skilled in the art to understand the technical content of the disclosure, the disclosure is further explained in combination with the attached drawings.

A wastewater pool mentioned in the disclosure refers to a continuous flow tank, an oxidation ditch tank and A$^2$/O tank (such as anaerobic tank, anoxic tank and aerobic tank).

EXAMPLE 1

The disclosure provides a filling support comprising a support frame and a fixed device supporting the support frame. The support frame comprises a hollow shaft 1 provided with a first height adjuster 5. The support frame is rotatably disposed on the fixed device via the hollow shaft 1. The support frame further comprises a fixed ring for loading a filling. The fixed ring is a hollow structure and comprises a plurality of holes 10. The fixed ring communicates with the hollow shaft 1 via a connection pipe 11. A vane is disposed on the hollow shaft 1 and below the fixed ring. The vane is configured to rotate in the presence of a water current thereby driving the support frame to rotate. One or more vanes are disposed on the hollow shaft as needed to drive the support frame to rotate. The hollow shaft comprises an upper part provided with an opening 101 through which a functional liquid (such as bacterial fermentation broth/enzyme mixture) is added to the hollow shaft; a plunger 12 is movably disposed in the hollow shaft 1 thereby pushing the functional liquid in the hollow shaft 1 to move.

The fixed device comprises an upper mounting plate 6, a lower mounting plate 7 opposite to the upper mounting plate 6, and at least one support pillar 8 connecting to the upper mounting plate and the lower mounting plate. The at least one support pillar is provided with a second height adjuster 9; and the support frame is rotatably disposed between the upper mounting plate 6 and the lower mounting plate 7. Specifically, the upper mounting plate 6 and the lower mounting plate 7 comprise a first through hole and a second through hole, respectively. The two through holes are aligned with each other. The upper end of the hollow shaft 1 extends from the first through hole 601 out of the upper mounting plate 6, and the lower end of the hollow shaft 1 extends from the second through hole 701 out of the lower mounting plate 7. A first annular bulge is disposed between the upper end of the hollow shaft 1 and the inner side of the upper mounting plate 6 (referring to the surface of the upper mounting plate 6 facing the lower mounting plate), and a second annular bulge is arranged between the lower end of the hollow shaft 1 and the inner side of the lower mounting plate 7 (referring to the surface of the lower mounting plate 7 facing the upper mounting plate 6). Optionally, the hollow shaft 1 can be rotatably disposed between the upper mounting plate 6 and the lower mounting plate 7 in other means.

The filling is a commonly used one in the biofilm process of wastewater treatment, such as composite packing, soft packing, honeycomb packing and elastic packing, etc. The filling can be tied to the fixed ring by ropes or belts.

The plunger 12 is provided with an elastic and retractable seal 13 made of compressible materials such as rubber. The retractable seal 13 can be a rubber ring/elastic material around the plunger 12 or a rubber ring arranged on the front end of the plunger 12. The arrangement of the retractable seal 13 ensures the tight connection of the plunger 12 with the hollow shaft 1, and poses no side effect of the movement of the functional liquid in the hollow shaft 1 under the push of the plunger 12.

Specifically, the fixed ring comprises an upper fixed ring 2 and a lower fixed ring 3 both connected to the hollow shaft 1 via the connection pipe. The vane is disposed between the upper fixed ring 2 and the lower fixed ring 3. Furthermore, the vane is further disposed below the lower fixed ring 3.

As shown in FIG. 1 and FIG. 5, the vane is in the shape of a fan blade 4. The fan blade 4 comprises a mounting surface 401, and is detachably connected to the hollow shaft 1 through the mounting surface 401. For example, a clamp (similar to a three-claw universal clamp for holding a test tube) is provided on the mounting surface 401 of the fan blade 4, and the fan blade 4 is fixed on the hollow shaft 1 through the clamp. Optionally, the fan blade 4 can also be fixed on the hollow shaft 1 in other ways.

The operation principle of the filling support is as follows:

Installation and test: the filling support loaded with the fillings is placed in a wastewater pool. The height of the filling support is adjusted using the first height adjuster, until the fixed ring is submerged below the liquid level of the wastewater pool. The water current of the wastewater pool drives the vane to rotate, thereby driving the support frame to rotate. When the rotation speed of the support frame is less than a preset value, more vanes can be disposed on the hollow shaft until the rotation speed reaches or exceeds the preset value.

Addition of a functional liquid: a functional liquid is added to the hollow shaft via the opening 101. The plunger 12 is inserted into the hollow shaft 1. Under the effect of gravity and the push of the plunger, the functional liquid flows via the connection pipe 11 to the fixed ring, drips via the holes 10 into the water, and diffuses and adsorbs on the fillings.

EXAMPLE 2

In this example, the filling support provided in Example 1 and a conventional filling fixing device are respectively used to modify an oxidation ditch tank of a wastewater treatment plant, and the influent water quality of the oxidation ditch tank, the effluent quality before and after the modification are measured respectively. The results are shown in Table 1. In this example, the volume of the fillings fixed on the support frame accounts for 40% of the volume of the wastewater pool.

The method for sewage treatment using the filling support provided in Example 1 is detailed as follows:

1) The filling support loaded with soft fillings was placed in the oxidation ditch tank, and the height of the filling support was adjusted until the soft fillings were completely immersed in the water of the oxidation ditch tank; the water intake speed of the oxidation ditch tank is 0.30 m/s;

2) the rotation speed of the support frame was 1 rpm, and two vanes were fixed on the support frame;

3) the support frame was rotating, a bacterial fermentation broth comprising *Pseudomonas aeruginosa, Sinorhizobium meliloti, Ruegeria*, and *Xanthomonas campestris* (the bacterial fermentation broth was filtered using a 0.22 micron film before use) was added into the hollow shaft 1; push the plunger 12, so that the bacterial fermentation broth was completely diffused into the water in 12-36 hours;

4) the wastewater pool was used for wastewater treatment for 36 consecutive months; and 5) in the process of wastewater treatment, when the rotation speed of the support frame was reduced to 0.1 rpm, an enzyme mixture was added to the hollow shaft 1, until the rotation speed of the support frame was increased to 0.6-0.7 rpm. The enzyme mixture comprises tyrosine, an acylase, and lactonase.

TABLE 1

Comparison of influent water quality, effluent quality before and after disposing a filling support of the disclosure in an oxidation ditch tank

| | Water quality index | | | | |
|---|---|---|---|---|---|
| | COD (mg/L) | Ammonia nitrogen (mg/L) | Total nitrogen (mg/L) | Total phosphorus (mg/L) | Biofilm activity (ATP/VS, mg/g) |
| Influent water quality | 120.4 | 25.5 | 41.7 | 7.3 | |
| After treatment using conventional filling support | 13.5 | 3.7 | 12.3 | 1.1 | 13.7 |
| After treatment using filling support of Example 1 | 8.7 | 1.6 | 4.7 | 0.5 | 47.9 |

As shown in Table 1, compared with the conventional fixation method of fillings, the effluent quality of the oxidation tank equipped with the filling support of the disclosure is greatly improved, and the filling support provided by the disclosure still exhibited biofilm activity after 36 months of continuous operation in the oxidation tank.

EXAMPLE 3

In this example, the filling support provided in Example 1 and a conventional filling fixing device are respectively used to modify an aerobic tank of a wastewater treatment plant, and the influent water quality of the aerobic tank, the effluent quality before and after the modification are measured respectively. The results are shown in Table 2. In this example, the volume of the fillings fixed on the support frame accounts for 60% of the volume of the aerobic tank.

The method for sewage treatment using the filling support provided in Example 1 is detailed as follows:

1) The filling support loaded with soft fillings was placed in the aerobic tank, and the height of the filling support was adjusted until the soft fillings were completely immersed in the water of the aerobic tank; the water intake speed of the aerobic tank is 0.28 m/s;

2) the rotation speed of the support frame was 2 rpm, and one vane was fixed on the support frame;

3) the support frame was rotating, a bacterial fermentation broth comprising *Pseudomonas aeruginosa, Sinorhizobium meliloti, Ruegeria*, and *Xanthomonas campestris* (the bacterial fermentation broth was filtered using a 0.22 micron film before use) was added into the hollow shaft 1; push the plunger 12, so that the bacterial fermentation broth was completely diffused into the water in 36 hours;

4) the wastewater pool was used for wastewater treatment for 36 consecutive months; and 5) in the process of wastewater treatment, when the rotation speed of the support frame was reduced to 0.5 rpm, an enzyme mixture was added to the hollow shaft 1, until the rotation speed of the support frame was increased to 0.6 rpm. The enzyme mixture comprises tyrosine and an acylase.

TABLE 2

Comparison of influent water quality, effluent quality before and after disposing a filling support of the disclosure in an aerobic tank

| | Water quality index | | | | |
|---|---|---|---|---|---|
| | COD (mg/L) | Ammonia nitrogen (mg/L) | Total nitrogen (mg/L) | Total phosphorus (mg/L) | Biofilm activity (ATP/VS, mg/g) |
| Influent water quality | 1600 | 11.9 | 35.7 | 20.3 | |
| After treatment using conventional filling support | 490 | 3.2 | 15.7 | 3.2 | 10.2 |
| After treatment using filling support of Example 1 | 154 | 2.1 | 5.7 | 0.9 | 77.6 |

As shown in Table 2, compared with the conventional fixation method of fillings, the effluent quality of the aerobic tank equipped with the filling support of the disclosure is greatly improved, and the filling support provided by the disclosure still exhibited biofilm activity after 36 months of continuous operation in the aerobic tank.

It will be obvious to those skilled in the art that changes and modifications may be made, and therefore, the aim in the appended claims is to cover all such changes and modifications.

What is claimed is:

1. A method, comprising:

1) fixing a filling support in a wastewater pool, wherein the filling support comprises a support frame and a fixed device; the support frame comprises a hollow shaft provided with a first height adjuster; the support frame is rotatably disposed on the fixed device via the hollow shaft; the support frame further comprises a first fixed ring to which a filling is secured, a first vane disposed on the hollow shaft and below the first fixed ring, and a connection pipe connecting the first fixed ring and the hollow shaft; the first fixed ring is a hollow structure and comprises a plurality of holes; the first fixed ring communicates with the hollow shaft via the connection pipe; the first vane is configured to rotate in the presence of a water current thereby driving the support frame to rotate; the hollow shaft comprises an upper part provided with an opening through which a functional liquid is added to the hollow shaft; a plunger is movably disposed in the hollow shaft thereby pushing the functional liquid in the hollow shaft to move;

2) adjusting a height of the filling support using the first height adjuster, until the first fixed ring is submerged below a liquid level of the wastewater pool, wherein a water intake velocity of the wastewater pool is no less than 0.25 m/s, whereby the water current is produced and drives the support frame to rotate; and adjusting a number of the first vane on the hollow shaft according to a rotation speed of the support frame;

3) adding the functional liquid via the opening into the hollow shaft, and adjusting a moving speed of the plunger so that the functional liquid is completely added in a preset time; and 4) adding an enzyme mixture to the hollow shaft when a rotation speed of the support frame is less than a first preset value, until the rotation speed of the support frame reaches a second preset value.

2. The method of claim 1, wherein the plunger is provided with a retractable seal.

3. The method of claim 2, wherein the support frame further comprises a second fixed ring disposed below the first fixed ring, and the first fixed ring and the second fixed ring are both connected to the hollow shaft via the connection pipe; the first vane is disposed between the first fixed ring and the second fixed ring, and a second vane is disposed below the second fixed ring.

4. The method of claim 3, wherein each of the first vane and the second vane is in the shape of a fan blade.

5. The method of claim 4, wherein the fixed device comprises an upper mounting plate, a lower mounting plate opposite to the upper mounting plate, and a support pillar connecting to the upper mounting plate and the lower mounting plate; and the support frame is rotatably disposed between the upper mounting plate and the lower mounting plate.

6. The method of claim 5, wherein the support pillar is provided with a second height adjuster.

7. The method of claim 1, wherein in 2), the rotation speed of the support frame is 1-3 rpm.

8. The method of claim 1, wherein in 3), the preset time is 12-36 hours.

9. The method of claim 1, wherein in 4), the first preset value is 0.1 rpm, and the second preset value is 0.6-0.75 rpm.

10. The method of claim 1, wherein the functional liquid is bacterial fermentation broth comprising *Pseudomonas aeruginosa, Sinorhizobium meliloti, Ruegeria*, and *Xanthomonas campestris.*

11. The method of claim 1, wherein the enzyme mixture comprises tyrosine and an acylase.

* * * * *